United States Patent
Chen et al.

(10) Patent No.: US 11,454,094 B2
(45) Date of Patent: Sep. 27, 2022

(54) DOWNHOLE POWER GENERATION SYSTEM AND OPTIMIZED POWER CONTROL METHOD THEREOF

(71) Applicant: GENERAL ELECTRIC COMPANY, Schenectady, NY (US)

(72) Inventors: Yunzheng Chen, Garching (DE); Yi Liao, Niskayuna, NY (US); Saijun Mao, Shanghai (CN); Ming Xue, Shanghai (CN); Stewart Blake Brazil, Niskayuna, NY (US); Xuele Qi, Niskayuna, NY (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 0 days.

(21) Appl. No.: 16/608,009

(22) PCT Filed: Apr. 24, 2018

(86) PCT No.: PCT/US2018/029057
§ 371 (c)(1),
(2) Date: Oct. 24, 2019

(87) PCT Pub. No.: WO2018/200463
PCT Pub. Date: Nov. 1, 2018

(65) Prior Publication Data
US 2021/0102444 A1 Apr. 8, 2021

(30) Foreign Application Priority Data
Apr. 24, 2017 (CN) .......................... 201710271102.0

(51) Int. Cl.
*F03B 13/02* (2006.01)
*F03B 15/00* (2006.01)
(Continued)

(52) U.S. Cl.
CPC .......... *E21B 41/0085* (2013.01); *F03B 13/02* (2013.01); *F03B 15/00* (2013.01);
(Continued)

(58) Field of Classification Search
CPC .................. E21B 41/0085; F03B 13/02; F05B 2220/7062; H02P 9/04; H02P 2101/10
(Continued)

(56) References Cited

U.S. PATENT DOCUMENTS 3,036,645 A * 5/1962 Rowley ..................... E21B 4/04
175/93
4,415,823 A * 11/1983 Jurgens ..................... E21B 4/00
310/87
(Continued)

FOREIGN PATENT DOCUMENTS

WO WO2016039748 A1 3/2016

OTHER PUBLICATIONS

International Search Report of the International Searching Authority for PCT/US2018/029057 dated Jul. 31, 2018.

*Primary Examiner* — Pedro J Cuevas
(74) *Attorney, Agent, or Firm* — Cantor Colburn LLP

(57) ABSTRACT

A downhole power generation system is disclosed, which includes a turbine generator system. The turbine generator system includes a turbine, a generator coupled with the turbine and having an AC-DC rectifier, and an optimized power control unit. The turbine is driven by flow of a downhole fluid to rotate. The generator converts rotational energy from the turbine to electrical energy and outputting a direct current voltage. The turbine generator system is coupled to a load via the optimized power control unit. The optimized power control unit controls to regulate an output voltage of the generator and provides a regulated output voltage to the load so that the turbine generator system has
(Continued)

an optimized power output. An optimized power control method for a downhole power generation system is also disclosed.

18 Claims, 13 Drawing Sheets

(51) Int. Cl.
*H02P 9/04* (2006.01)
*H02P 101/10* (2015.01)
*E21B 41/00* (2006.01)

(52) U.S. Cl.
CPC ........ *H02P 9/04* (2013.01); *F05B 2220/7062* (2013.01); *H02P 2101/10* (2015.01)

(58) Field of Classification Search
USPC .............. 290/52, 54; 175/104, 107; 310/87
See application file for complete search history.

(56) References Cited

U.S. PATENT DOCUMENTS

| | | | | |
|---|---|---|---|---|
| 4,740,711 | A * | 4/1988 | Sato | F03B 13/10 290/52 |
| 5,517,464 | A * | 5/1996 | Lerner | E21B 47/20 367/84 |
| 5,839,508 | A * | 11/1998 | Tubel | G01V 1/42 166/65.1 |
| 5,946,202 | A * | 8/1999 | Balogh | H02M 3/33576 363/134 |
| 6,011,346 | A * | 1/2000 | Buchanan | E21B 41/0085 310/339 |
| 6,239,996 | B1 * | 5/2001 | Perreault | H02M 7/217 363/37 |
| 6,346,797 | B1 * | 2/2002 | Perreault | H02P 6/182 322/29 |
| 6,456,514 | B1 * | 9/2002 | Perreault | H02P 9/48 363/89 |
| 6,671,195 | B2 * | 12/2003 | Perreault | B60L 50/51 361/88 |
| 6,672,409 | B1 * | 1/2004 | Dock | E21B 7/046 166/66.5 |
| 6,717,283 | B2 * | 4/2004 | Skinner | E21B 41/0085 290/43 |
| 6,900,997 | B2 * | 5/2005 | Perreault | B60L 3/003 363/127 |
| 6,912,142 | B2 * | 6/2005 | Keim | H02J 7/1423 363/89 |
| 7,002,261 | B2 * | 2/2006 | Cousins | E21B 41/0085 290/43 |
| 7,133,325 | B2 * | 11/2006 | Kotsonis | E21B 41/0085 367/83 |
| 7,687,950 | B2 * | 3/2010 | Kuckes | E21B 41/0085 310/87 |
| 7,814,993 | B2 * | 10/2010 | White | E21B 41/0085 175/93 |
| 8,957,538 | B2 * | 2/2015 | Inman | E21B 41/0085 290/52 |
| 9,534,577 | B2 * | 1/2017 | Inman | F03B 15/06 |
| 9,863,238 | B2 * | 1/2018 | Miles | E21B 47/13 |
| 9,879,506 | B2 * | 1/2018 | Frosell | E21B 43/088 |
| 9,896,912 | B2 * | 2/2018 | Tegeler | E21B 47/18 |
| 10,110,091 | B2 | 10/2018 | Gawski et al. | |
| 10,196,921 | B2 * | 2/2019 | Gatzen | E21B 41/0085 |
| 10,250,103 | B2 * | 4/2019 | Gawski | H02K 7/1823 |
| 2002/0089866 | A1 * | 7/2002 | Keim | H02P 9/307 363/89 |
| 2002/0176266 | A1 * | 11/2002 | Perreault | H02P 9/48 363/53 |
| 2003/0075997 | A1 * | 4/2003 | Keim | H02P 6/182 310/68 R |
| 2004/0085787 | A1 * | 5/2004 | Perreault | H02P 9/48 363/89 |
| 2007/0194947 | A1 | 8/2007 | Huang et al. | |
| 2010/0000793 | A1 * | 1/2010 | White | E21B 41/0085 175/57 |
| 2011/0198848 | A1 * | 8/2011 | Rytlewski | H02K 7/1823 290/52 |
| 2012/0139250 | A1 * | 6/2012 | Inman | F03B 15/06 290/52 |
| 2014/0311806 | A1 * | 10/2014 | Bruder | E21B 33/085 175/104 |
| 2014/0354081 | A1 | 12/2014 | Li et al. | |
| 2015/0034294 | A1 * | 2/2015 | Miles | H02K 5/1285 166/66.5 |
| 2015/0068298 | A1 * | 3/2015 | Inman | E21B 34/105 73/152.54 |
| 2015/0091306 | A1 | 4/2015 | Pridgeon | |
| 2015/0108767 | A1 * | 4/2015 | Winslow | E21B 4/006 290/1 C |
| 2015/0303771 | A1 * | 10/2015 | Downing | E21B 41/0085 290/50 |
| 2016/0265315 | A1 | 9/2016 | Frosell et al. | |
| 2016/0333670 | A1 * | 11/2016 | Tegeler | H02M 7/219 |
| 2017/0362953 | A1 * | 12/2017 | Gatzen | E21B 41/0085 |
| 2019/0178099 | A1 * | 6/2019 | Gatzen | H02K 1/2786 |
| 2020/0056458 | A1 * | 2/2020 | Mao | H02K 11/0094 |
| 2020/0300083 | A1 * | 9/2020 | Fellinghaug | E21B 47/14 |

* cited by examiner

DOWNHOLE POWER GENERATION SYSTEM AND OPTIMIZED POWER CONTROL METHOD THEREOF

BACKGROUND

This disclosure relates generally to power generation systems, and more particularly to a downhole power generation system and an optimized power control method for a downhole power generation system.

Downhole drilling or sensing systems are used in oil and gas exploration and production wells. Some downhole sensors for fracturing monitoring and long-term production surveillance, downhole data communication module and other downhole loads are often applied to the downhole drilling or sensing systems for performing their respective functions. These downhole loads require power to operate. It is well known in the art to use a turbine generator system. Flow of a downhole fluid, for example production fluid drives a turbine of the turbine generator system to rotate and generate rotational energy. The turbine generator system uses an electrical generator to convert the rotational energy from the turbine to electrical energy, and power can be thus provided to these downhole loads.

However, the downhole has a very harsh environment, for example, high temperature, high pressure and sand buildup. Furthermore, due to complexity of the downhole fluid and variability of flow of the downhole fluid, the flow rate of the downhole fluid is not constant. In the condition that the turbine generator system is driven by the downhole fluid having different flow rates, the turbine generator system would have different output characteristics.

Therefore, in the view of the foregoing, a need how to optimize power output of the turbine generator system at any flow rate of the downhole fluid is becoming increasingly urgent.

BRIEF DESCRIPTION

In one aspect of embodiments of the present disclosure, a downhole power generation system is provided. The downhole power generation system comprises a turbine generator system. The turbine generator system comprises a turbine, a generator coupled with the turbine and having an AC-DC rectifier, and an optimized power control unit. The turbine is driven by flow of a downhole fluid to rotate. The generator converts rotational energy from the turbine to electrical energy and outputting a direct current voltage. The turbine generator system is coupled to a load via the optimized power control unit. The optimized power control unit controls to regulate an output voltage of the generator and provides a regulated output voltage to the load so that the turbine generator system has an optimized power output.

In another aspect of embodiments of the present disclosure, an optimized power control method for a downhole power generation system is provided. The optimized power control method comprises: harvesting hydro energy from flow of a downhole fluid via one or more turbines in one or more turbine generator systems; converting one or more rotational energies from the one or more turbines, by one or more generators with AC-DC rectifier in the one or more turbine generator systems, to one or more electrical energies and outputting one or more direct current voltages; controlling to regulate an output voltage of each of the one or more generators; and providing a regulated output voltage of each generator to a load so that each of the one or more turbine generator systems has an optimized power output.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Embodiments of the present disclosure will be described hereinbelow with reference to the accompanying drawings. In the following description, well-known functions or constructions are not described in detail to avoid obscuring the disclosure in unnecessary detail.

Unless defined otherwise, technical and scientific terms used herein have the same meaning as is commonly understood by one of ordinary skill in the art to which this disclosure belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean either or all of the listed items. The use of "including", "comprising" or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect. In addition, Terms indicating specific locations, such as "top", "bottom", "left", and "right", are descriptions with reference to specific accompanying drawings. Embodiments disclosed in the present disclosure may be placed in a manner different from that shown in the figures. Therefore, the location terms used herein should not be limited to locations described in specific embodiments.

Definition of Voltage Ratio for Optimized Power Control

Figure 1:
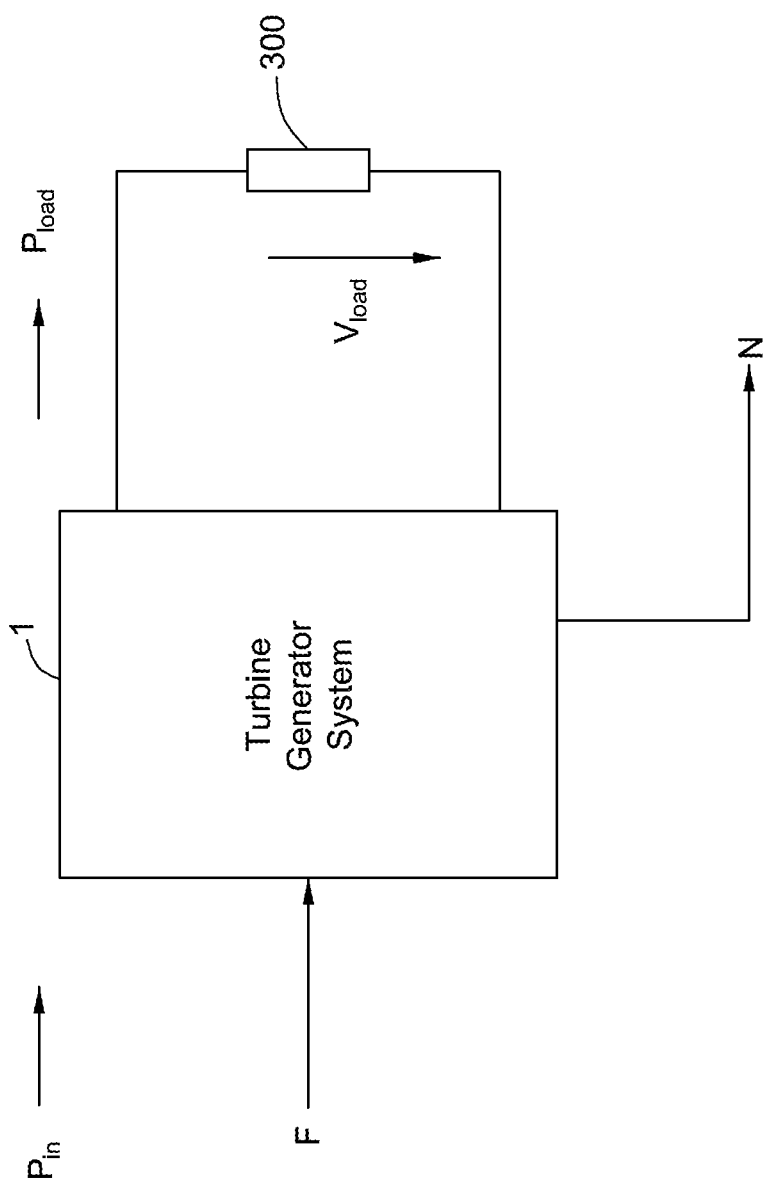
FIG. 1 is a schematic diagram of a downhole power generation system using a turbine generator system.

FIG. 1 illustrates a schematic diagram of a downhole power generation system. As shown in FIG. 1, the downhole power generation system uses a turbine generator system 1 to provide an output power $P_{load}$ for a load 300. The turbine generator system 1 can be driven by flow of a downhole fluid to rotate and output a direct current (DC) voltage $V_{load}$ to the load 300.

Because the flow of the downhole fluid in the downhole may be varied with time, in the different time, the turbine generator system 1 may be driven to rotate by the downhole fluid having different flow rate F and may have different rotational speed N.

Figure 2:
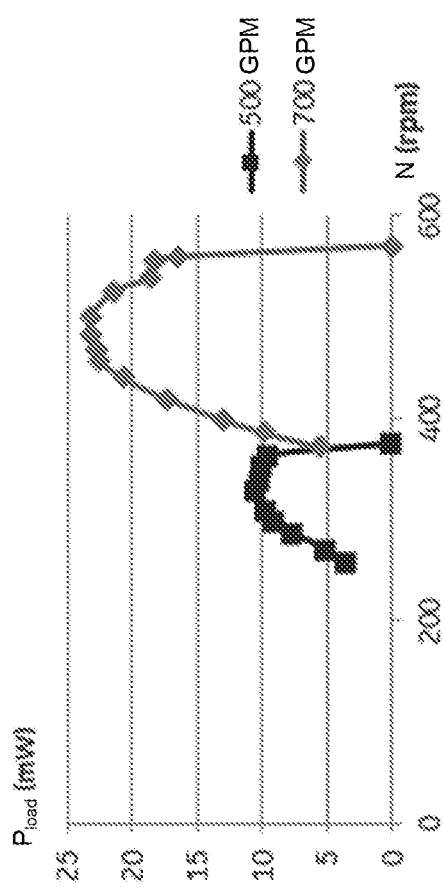
FIG. 2 is characteristics curves of an output power in relation to a rotational speed of the turbine generator system of FIG. 1 at different flow rates of a downhole fluid.

FIG. 2 illustrates characteristics curves of the output power $P_{load}$ in relation to the rotational speed N of the turbine generator system 1 at different flow rates F of the downhole fluid. As shown in FIG. 2, at the flow rates of 500 GPM (gallons per minute) and 700 GPM, the turbine generator system 1 has different output power-rotational speed ($P_{load}$–N) curves respectively. The maximum power output points of the turbine generator system 1 at different flow rates F are different.

Figure 3:
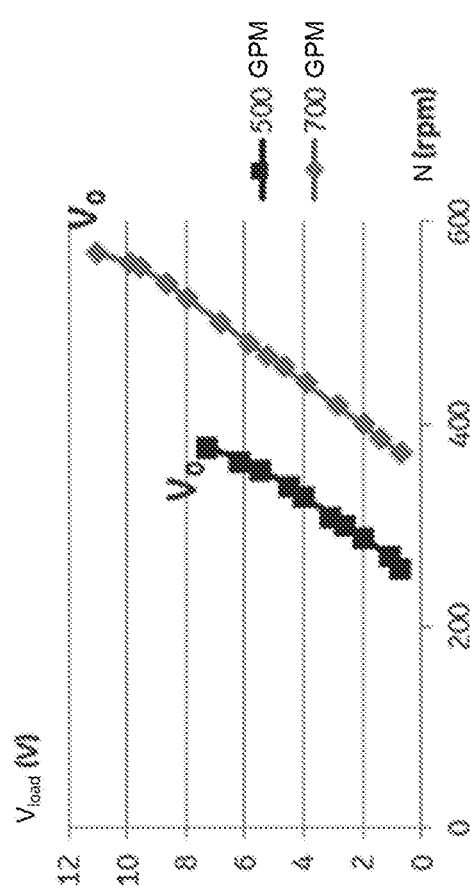
FIG. 3 is characteristics curves of an output voltage in relation to the rotational speed of the turbine generator system of FIG. 1 at different flow rates of the downhole fluid.

FIG. 3 illustrates characteristics curves of the output voltage $V_{load}$ in relation to the rotational speed N of the turbine generator system 1 at different flow rates F of the downhole fluid. As shown in FIG. 3, at the flow rates of 500 GPM and 700 GPM, the turbine generator system 1 has different output voltage-rotational speed ($V_{load}$–N) curves respectively. In FIG. 3, $V_0$ represents an open circuit voltage of the turbine generator system 1 when the turbine generator system 1 is disconnected from the load 300. The open circuit voltage $V_0$ of the turbine generator system 1 is defined as a constant no load voltage of the turbine generator system 1 after disconnection from the load 300.

Figure 4:
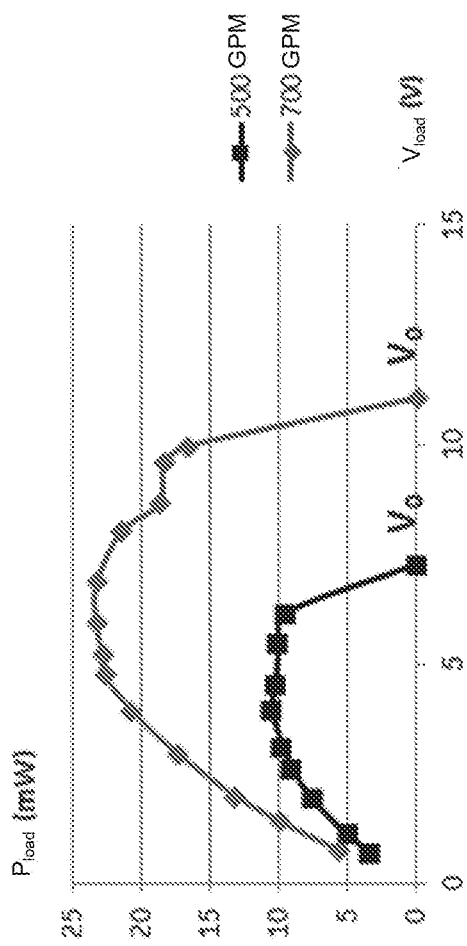
FIG. 4 is characteristics curves of the output power in relation to the output voltage of the turbine generator system of FIG. 1 at different flow rates of the downhole fluid.

Based on FIG. 2 and FIG. 3, characteristics curves of the output power $P_{load}$ in relation to the output voltage $V_{load}$ of the turbine generator system 1 at the flow rates of 500 GPM and 700 GPM can be plotted, as shown in FIG. 4. It can be seen from FIG. 4 that at the different flow rates F of the downhole fluid, the turbine generator system 1 has different output power-output voltage ($P_{load}$–$V_{load}$) curves respectively. Furthermore, it can be found from FIG. 4 that for a given flow rate F of the downhole fluid, the output power $P_{load}$ of the turbine generator system 1 can be changed by adjusting the output voltage $V_{load}$ of the turbine generator system 1.

From FIG. 4, the applicant of this application finds that a ratio of the output voltage $V_{load}$ of the turbine generator system 1 to the open circuit voltage $V_0$ of the turbine generator system 1 (simply called as a voltage ratio), R, is fixed for any flow rate F of the downhole fluid.

$$R = \frac{V_{load}}{V_0} \qquad (1)$$

Figure 5:
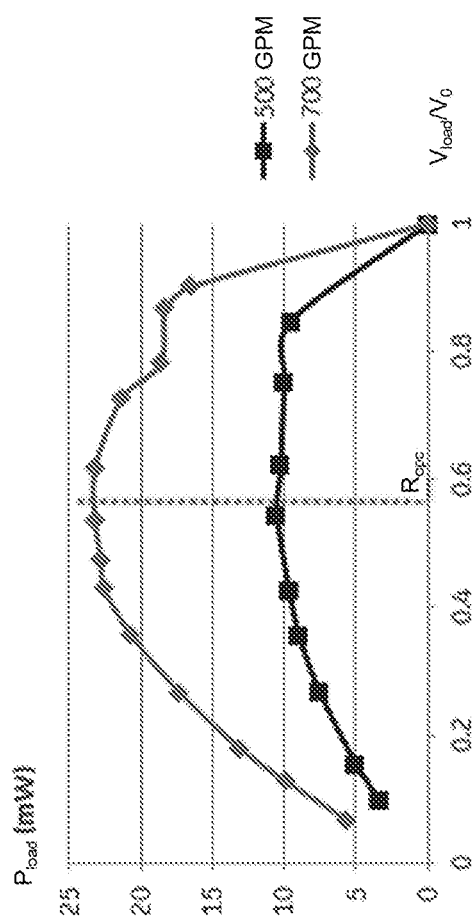
FIG. 5 is characteristics curves of the output power in relation to a ratio of the output voltage to an open circuit voltage of the turbine generator system of FIG. 1 at different flow rates of the downhole fluid.

Thus, based on FIG. 4, characteristics curves of the output power $P_{load}$ in relation to the voltage ratio R of the turbine generator system 1 at the flow rates of 500 GPM and 700 GPM can be plotted, as shown in FIG. 5. It can be seen from FIG. 5 that the output power $P_{load}$ of the turbine generator system 1 can be controlled with the voltage ratio R. Furthermore, as shown in the dotted line of FIG. 5, the maximum output power points of the turbine generator system 1 at the flow rates of 500 GPM and 700 GPM correspond to the same voltage ratio $R_{opc}$ which is for example about 0.58 in this case. Although FIG. 5 is shown only using the two flow rates of 500 GPM and 700 GPM, this voltage ratio $R_{opc}$ corresponding to the maximum output power point of the turbine generator system 1 is constant for any flow rate F of the downhole fluid.

Figure 6:
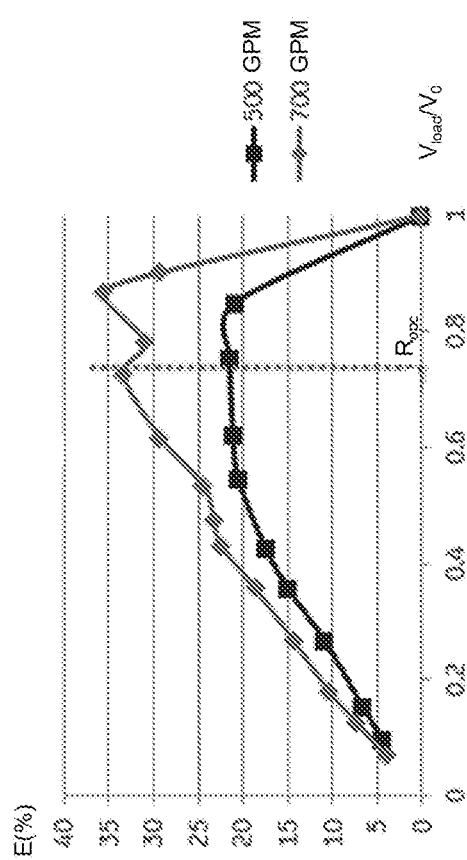
FIG. 6 is characteristics curves of system efficiency in relation to the ratio of the output voltage to the open circuit voltage of the turbine generator system of FIG. 1 at different flow rates of the downhole fluid.

In addition, based on FIG. 4, characteristics curves of system efficiency E in relation to the voltage ratio R of the turbine generator system 1 at the flow rates of 500 GPM and 700 GPM can be plotted, as shown in FIG. 6.

$$E = \frac{P_{load}}{P_{in}} \qquad (2)$$

In equation (2) above, E represents the system efficiency of the turbine generator system 1, $P_{in}$ represents an input power of the turbine generator system 1. It can be seen from FIG. 6 that the system efficiency E of the turbine generator system 1 can be also controlled with the voltage ratio R. Furthermore, as shown in the dotted line of FIG. 6, the maximum system efficiency points of the turbine generator system 1 at the flow rates of 500 GPM and 700 GPM correspond to the same voltage ratio $R_{opc}$ which is for example about 0.75 in this case. Although FIG. 6 is shown only using the two flow rates of 500 GPM and 700 GPM, this voltage ratio $R_{opc}$ corresponding to the maximum system efficiency point of the turbine generator system 1 is constant for any flow rate F of the downhole fluid.

Although FIGS. 2-6 are demonstrated only using two flow rates of the downhole fluid, the above conclusion can be valid for different operation conditions of the turbine generator system 1, i.e. any flow rate F of the downhole fluid.

Because an optimized power control of the turbine generator system 1 targets on the maximum power output of the turbine generator system 1 or the maximum system efficiency of the turbine generator system 1, the voltage ratio corresponding to the maximum output power point of the turbine generator system 1 in FIG. 5 or the voltage ratio corresponding to the maximum system efficiency point of the turbine generator system 1 in FIG. 6 may be defined as a voltage ratio for optimized power control of the turbine generator system 1 (also called as an optimized voltage ratio), $R_{opc}$.

First Embodiment of Downhole Power Generation System

Figure 7:
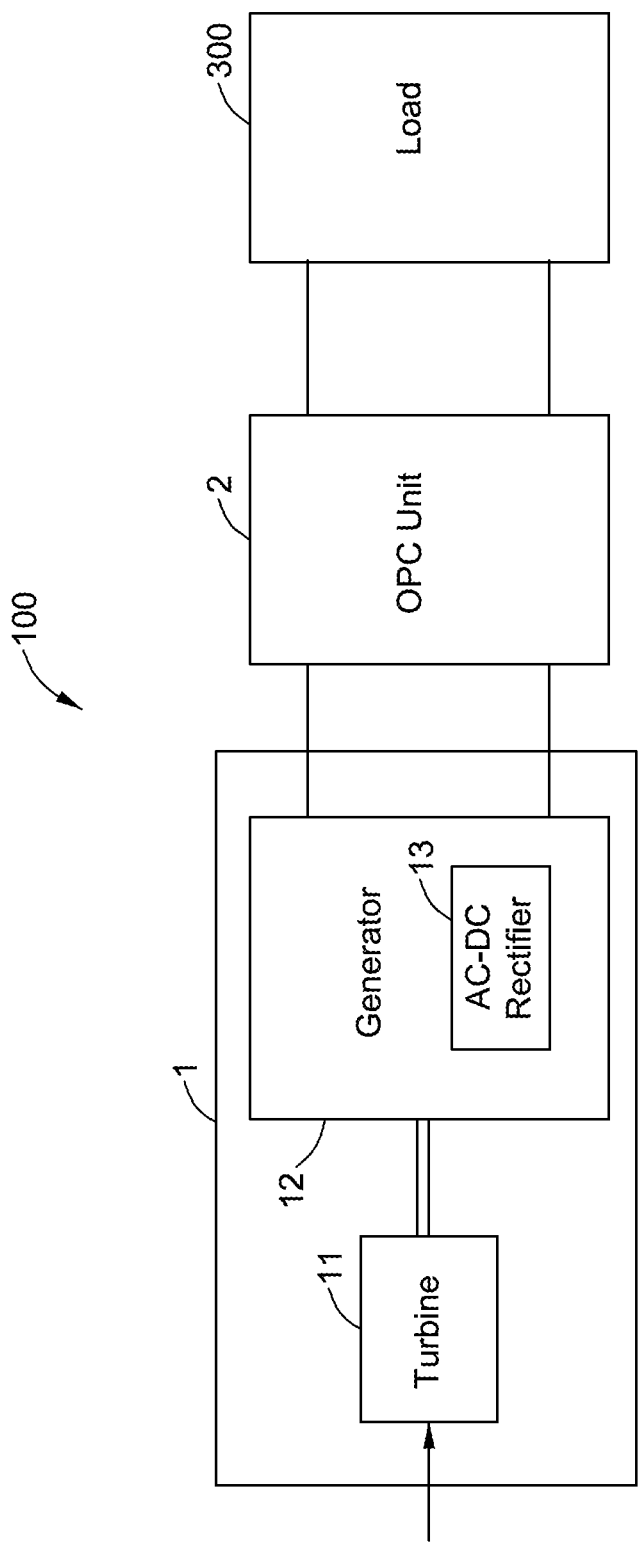
FIG. 7 is a schematic diagram of a downhole power generation system in accordance with an embodiment of the present disclosure.

FIG. 7 illustrates a schematic diagram of a downhole power generation system 100 in accordance with an embodiment of the present disclosure. The downhole power generation system 100 includes a turbine generator system 1 and the turbine generation system 1 can provide power to a load 300. The load 300 may for example include sensors such as temperature and pressure sensor, and flow rate sensor, or a data communication module. The turbine generator system 1 includes a turbine 11, and a generator 12 coupled with the turbine 11 and having an AC-DC (Alternating Current-Direct Current) rectifier 13. The turbine 11 can be driven by flow of a downhole fluid to rotate. The generator 12 can convert rotational energy from the turbine 11 to electrical energy and outputting a direct current (DC) voltage.

The downhole power generation system 100 of the present disclosure further includes an optimized power control (OPC) unit 2. The turbine generator system 1 is coupled to the load 300 via the OPC unit 2. The OPC unit 2 can control to regulate an output voltage of the generator 12 and provide a regulated output voltage $V_r$ to the load 300 so that the turbine generator system 1 has an optimized power output. The OPC unit 2 may be implemented by hardware, software, or a combination thereof. The optimized power output targets on a maximum power output of the turbine generator system 1 or a maximum system efficiency of the turbine generator system 1.

Hereinafter, how does the OPC unit 2 control to regulate the output voltage of the generator 12 so that the turbine generator system 1 has the optimized power output will be explained in detail with combined reference to FIGS. 8 and 9.

Figure 8:
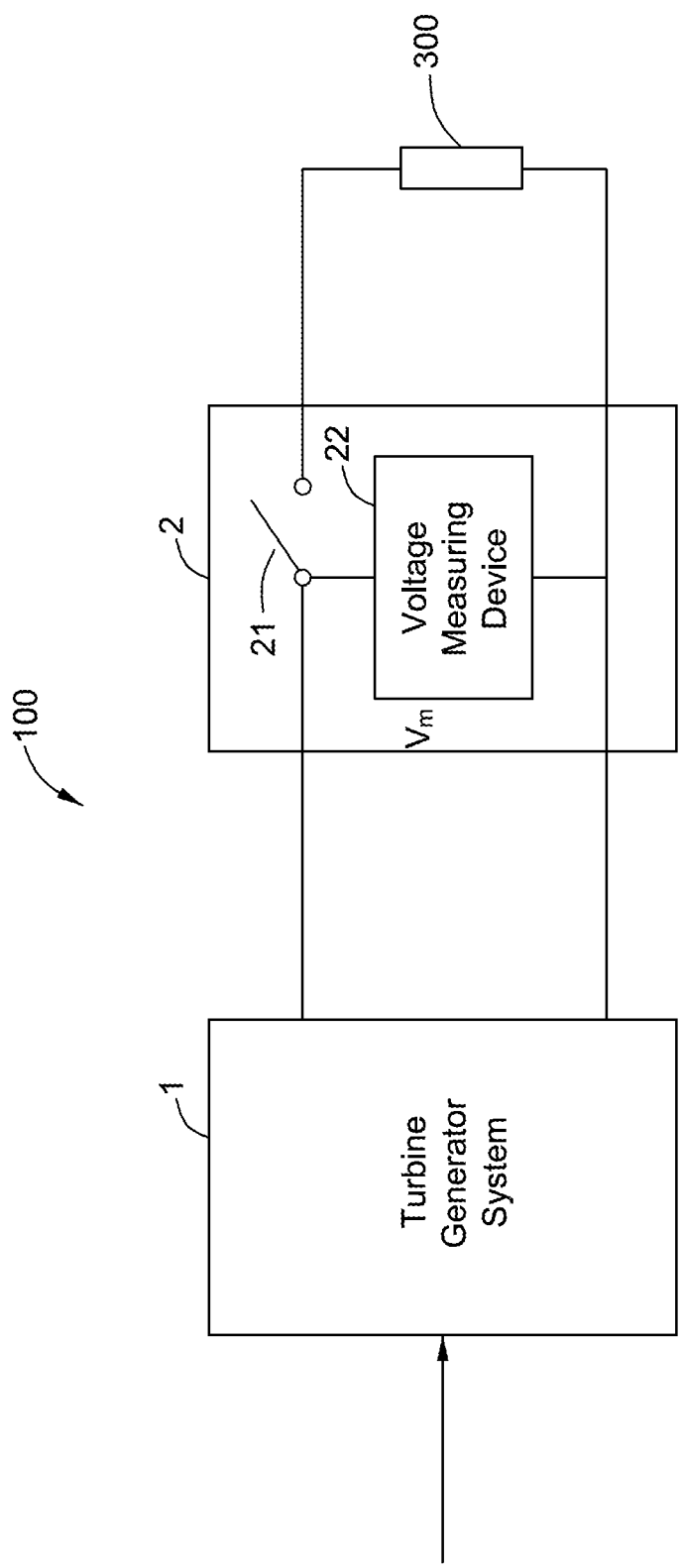
FIG. 8 is a schematic diagram of the downhole power generation system of FIG. 7 when an OPC unit disconnects a turbine generator system from a load.
Figure 9:
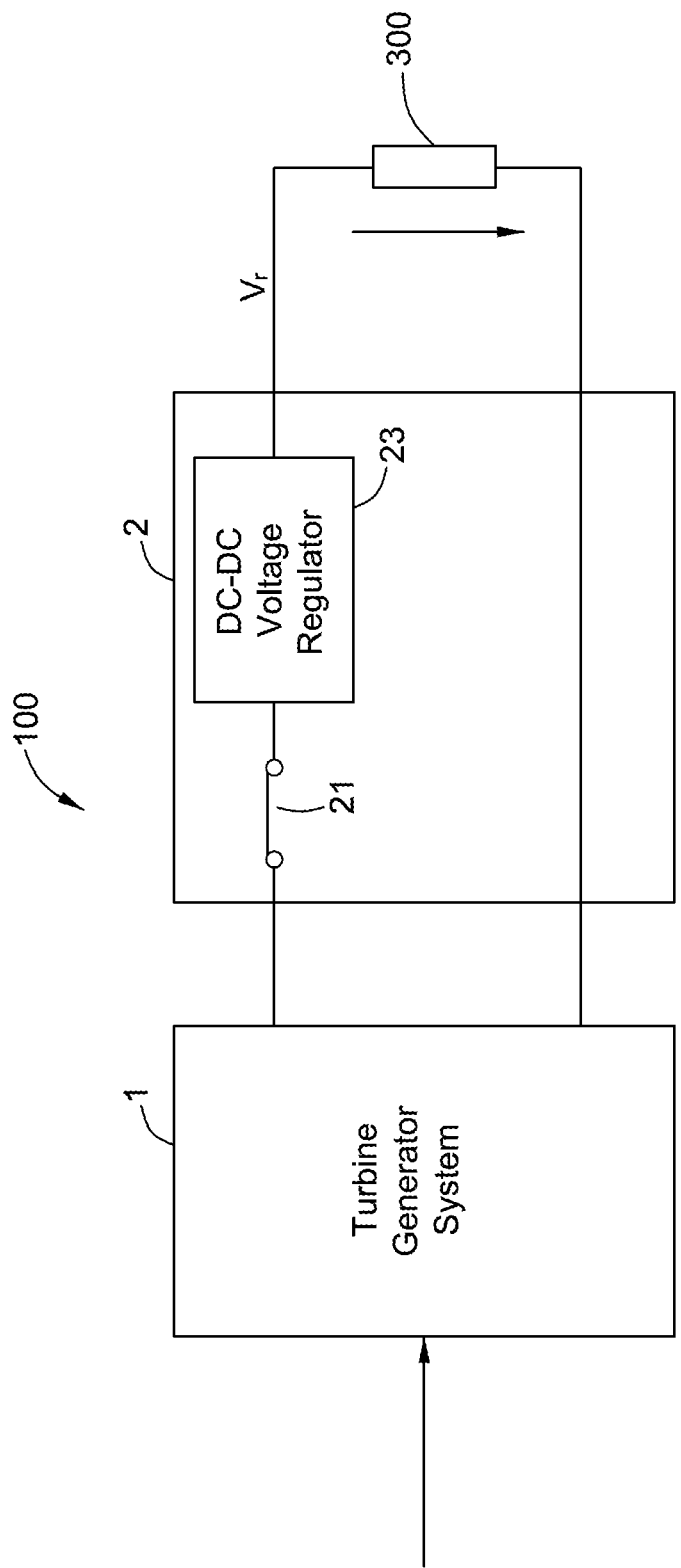
FIG. 9 is a schematic diagram of the downhole power generation system of FIG. 7 when the OPC unit reconnects the turbine generator system with the load.

Referring to FIGS. 8 and 9, the OPC unit 2 may include a switch 21, a voltage measuring device 22 and a DC-DC voltage regulator 23. The OPC unit 2 can regularly disconnects the generator 12 from the load 300. As shown in FIG. 8, the switch 21 is turned off and then, the voltage measuring device 22 of the OPC unit 2 measures an output voltage of the generator 12 after disconnection. Next, the OPC unit 2 reconnects the generator 12 with the load 300. As shown in FIG. 9, the switch 21 is turned on and then, the DC-DC voltage regulator 23 of the OPC unit 2 regulates the output voltage of the generator 12 equal to the measured output voltage of the generator 12 multiplied by a voltage ratio predefined for optimized power control of the turbine generator system 1 (i.e. optimized voltage ratio), $R_{opc}$.

$$V_r = V_m \times R_{opc} \quad (3)$$

In equation (3) above, $V_m$ represent a measured output voltage of the generator 12, and $V_r$ represents a regulated voltage of the generator 12.

The optimized voltage ratio $R_{opc}$ is equal to a ratio of an optimized power control (OPC) voltage of the generator 12 to an open circuit voltage of the generator 12 at any one flow rate of the downhole fluid. The OPC voltage of the generator 12 is defined as a voltage in which the turbine generator system 1 has the optimized power output at the any one flow rate of the downhole fluid.

$$R_{opc} = \frac{V_{opc}}{V_0} \quad (4)$$

In equation (4) above, $V_{opc}$ represents the OPC voltage of the generator 12. For example, $V_{opc}$ may represent a voltage of the generator 12 corresponding to the maximum power output at the any one flow rate of the downhole fluid, or $V_{opc}$ may represent a voltage of the generator 12 corresponding to the maximum system efficiency at the any one flow rate of the downhole fluid.

The voltage ratio for optimized power control of the turbine generator system, i.e. the optimized voltage ratio $R_{opc}$ is constant for different flow rates of the downhole fluid.

Hereinafter, the maximum power output of the turbine generator system 1 will be taken as an illustrative example of the optimized power output of the turbine generator system 1 to describe.

Therefore, as long as the open circuit voltage $V_0$ of the generator 12 and the OPC voltage $V_{opc}$ of the generator 12 corresponding to the maximum power output of the turbine generator system 1 at any one flow rate of the downhole fluid is measured in advance, the optimized voltage ratio $R_{opc}$ can be easily obtained in advance from equation (4).

Because the output voltage of the generator 12 after disconnection of the generator 12 from the load 300 cannot reach the open circuit voltage $V_0$ of the generator 12 immediately, which need a time duration, measuring the output voltage of the generator 12 after disconnection may include two cases as follows.

In the case that the generator 12 is disconnected from the load 300 for an enough long time so that the generator 12 has a constant no load voltage, the voltage measuring device 22 of the OPC unit 2 can measure an open circuit voltage $V_0$ of the generator 12. The open circuit voltage $V_0$ of the generator 12 is defined as the constant no load voltage of generator 12 after disconnection. Under this circumstance, after the OPC unit 2 reconnects the generator 12 with the load 300, the DC-DC voltage regulator 23 of the OPC unit 2 can regulate the output voltage of the generator 12 equal to the measured open circuit voltage of the generator multiplied by the optimized voltage ratio $R_{opc}$.

$$V_r = V_0 \times R_{opc} \quad (5)$$

Therefore, as long as the open circuit voltage $V_0$ of the generator 12 at the flow rate of the downhole fluid is measured and the optimized voltage ratio $R_{opc}$ is pre-given, the regulated voltage $V_r$ of the generator 12 can be easily calculated according to equation (5).

However, when the generator 12 is disconnected from the load 300 for a short time, for example a predetermined cutoff time $T_{cutoff}$, the output voltage of the generator 12 cannot reach the open circuit voltage $V_0$. In this case, the voltage measuring device 22 of the OPC unit 2 can measure a cutoff voltage $V_{cutoff}$ of the generator 12 after the predetermined cutoff time $T_{cutoff}$. The predetermined cutoff time $T_{cutoff}$ may depend on the characteristics of the turbine generator system 1 and may be given in advance in the OPC unit 2. Next, the OPC unit 2 reconnects the generator 12 with the load 300, and then, the DC-DC voltage regulator 23 of the OPC unit 2 can regulate the output voltage of the generator 12 equal to the measured cut-off voltage $V_{cutoff}$ of the generator 12 multiplied by the optimized voltage ratio $R_{opc}$.

$$V_r = V_{cutoff} \times R_{opc} \quad (6)$$

Therefore, as long as the cutoff voltage $V_{cutoff}$ of the generator 12 at the flow rate of the downhole fluid is measured and the optimized voltage ratio $R_{opc}$ is pre-given, the regulated voltage $V_r$ of the generator 12 can be easily calculated according to equation (6).

Because the predetermined cutoff time $T_{cutoff}$ is short, after one round of disconnecting, measuring, reconnecting and regulating above, the output voltage of the generator 12 after disconnection cannot reach the open circuit voltage $V_0$ yet. In order that the output voltage of the generator 12 after disconnection may reach the open circuit voltage $V_0$, the OPC unit 2 can repeat the steps of disconnecting, measuring, reconnecting and regulating above till the measured cutoff voltage $V_{cutoff}$ of the generator 12 approaches constant. Thus, after several rounds of repeating above, the turbine generator system 1 will finally achieve the maximum power output.

Figure 10:
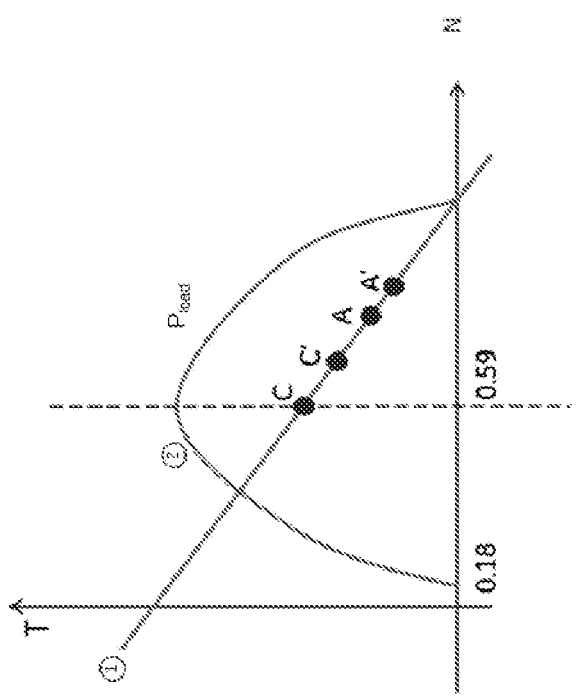
FIG. 10 is a schematic diagram for explaining an optimized power control process.

FIG. 10 illustrates a schematic diagram for explaining the optimized power control process above. As shown in FIG. 10, line ① represents a torque-rotational speed (T–N) curve of the generator 12 and curve ② represents an output power-rotational speed ($P_{load}$–N) curve of the generator 12. The turbine generator system 1 is driven by the downhole fluid having a certain flow rate to operate. At the beginning, the generator 12 works at a stable working point, for example point A. When the switch 21 is turned off, the OPC unit 2 disconnects the generator 12 from the load 300, at this time, the rotational speed N of the generator 12 increases. After the predetermined cutoff time $T_{cutoff}$, the generator 12 operates at for example point A' and a cutoff voltage $V_{cutoff}$ of the generator 12 at point A' is measured. Next, the switch 21 is turned on. The OPC unit 2 reconnects the generator 12 with the load 300, and regulates the output voltage of the generator 12 equal to the measured cut-off voltage $V_{cutoff}$ of the generator 12 multiplied by the optimized voltage ratio $R_{opc}$. Then, the generator 12 will work at the next stable working point, for example point C'. After one round above, the generator's working point changes from point A to point C'.

Then, a process of disconnecting, measuring, reconnecting and regulating above is repeated. The generator 12 will repeat a pattern like A→A'→C' above and change from the stable working point C' to another stable working point (not labeled). After several rounds of repeating, the generator 12 will finally work towards the maximum power output point C. Thus, by the optimized power controlling of the OPC unit 2, the turbine generator system 1 will achieve the maximum power output.

Although the OPC function of the OPC unit 2 is explained by taking the maximum power output as an example of the optimized power output, the OPC function of the OPC unit 2 can be similarly applied to the maximum system efficiency of the turbine generator system 1 without departing the substance of the present disclosure.

The downhole power generation system 100 of the first embodiment can achieve the maximum power output or the maximum system efficiency by the optimized power controlling of the OPC unit 2.

Second Embodiment of Downhole Power Generation System

Figure 11:
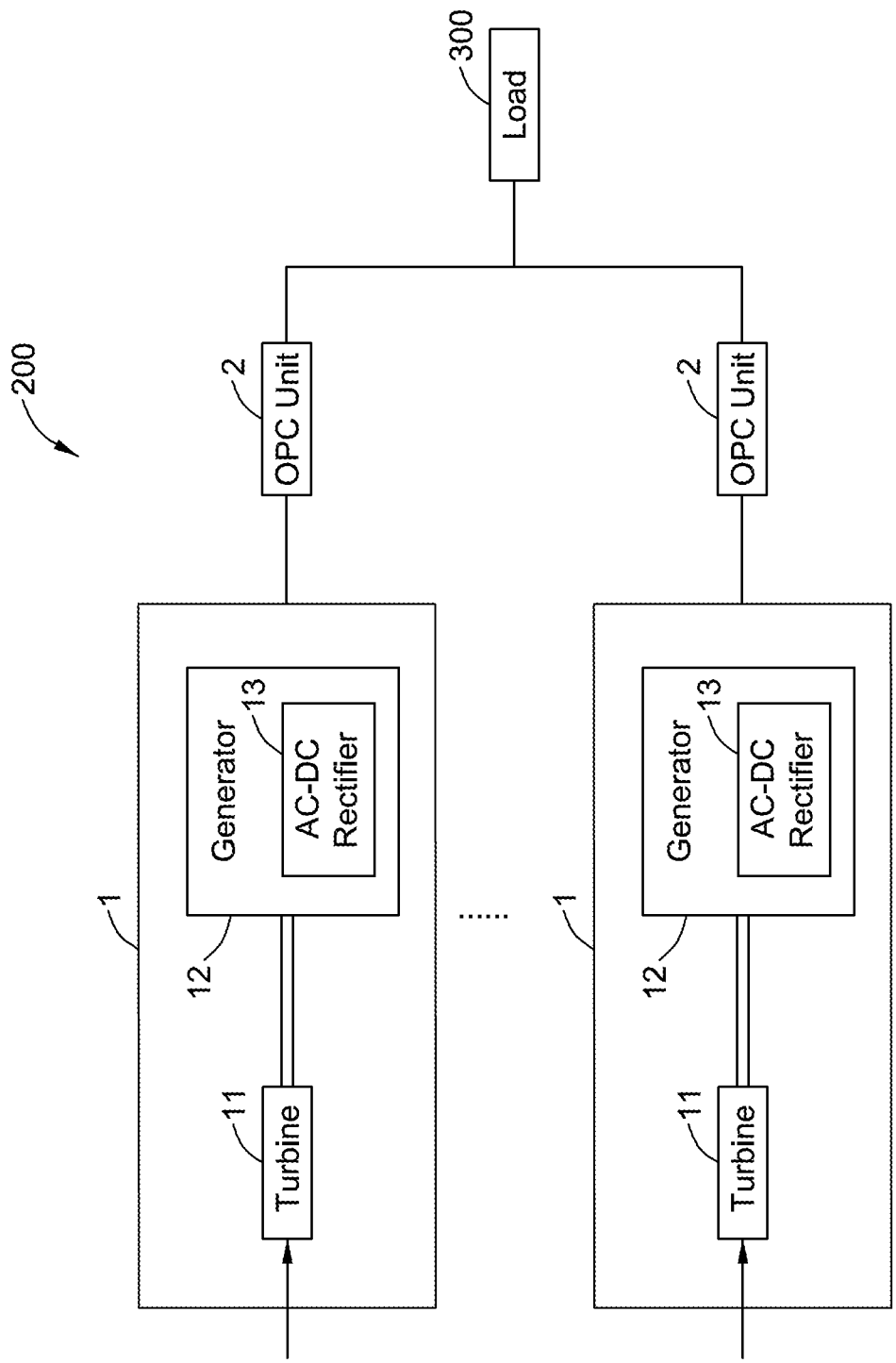
FIG. 11 is a schematic diagram of a downhole power generation system in accordance with another embodiment of the present disclosure.

FIG. 11 illustrates a schematic diagram of a downhole power generation system 200 in accordance with another embodiment of the present disclosure. As shown in FIG. 11, different from the downhole power generation system 100 of the first embodiment, the downhole power generation system 200 of the second embodiment may include a plurality of turbine generator systems 1. The plurality of turbines 11 in the plurality of turbine generator systems 1 are so positioned physically that one or more turbines 11 is exposed to the downhole fluid. The flow of the downhole fluid may drive the one or more turbines 11 to rotate. The plurality of turbine generator systems 1 can provide one or more powers to the load 300.

In the downhole power generation system 200 of the second embodiment, because a multiplicity of turbines 11 can ensure that one or more of the plurality of turbines 11 is exposed to the flow of the downhole fluid in a multiphase environment, such the multi-turbine power generation configuration can achieve a reliable and redundant power supply for the load 300.

Furthermore, because the plurality of turbines 11 are distributed in the multiphase environment, the plurality of turbines 11 may be driven by the downhole fluid having different flow rates due to respective different physical positions and may thus have different rotational speeds. Due to different physical positions of respective turbines 11 of the plurality of turbine generator systems 1, the plurality of turbine generator systems 1 may generate different amounts of power. All the different amounts of power can be provided to the load 300. The amounts of power generated from the plurality of turbine generator systems 1 depend on physical positions of respective turbines 11. The downhole power generation system 200 of the second embodiment allows each of the plurality of turbines 11 to rotate at the different rotational speed and maximize the power generated from each of the plurality of turbines 11.

The plurality of turbines 11 in the plurality of turbine generator systems 1 may be distributed around a flow path of the downhole fluid. As an example, the downhole fluid flows within a casing, and the plurality of turbines 11 may be spacedly arranged at an inner circumferential wall of the casing or deployed closer to the center of the casing. The plurality of turbines 11 distributed in the multiphase environment can ensure that the flow of the downhole fluid can drive at least one turbine 11 to operate and it thus provide a redundant and more reliable power supply to the load 300.

When the flow rate of the downhole fluid is sufficient, the downhole fluid may be full of the whole casing, in this circumstance, all the turbines 11 may operate, but the plurality of turbines 11 may be driven by the downhole fluid having different flow rates. For example, because the downhole fluid may include many impurities, the flow of the downhole fluid at a top inner wall of the casing may be dominated by gas and the flow of the downhole fluid at a bottom inner wall of the casing may be blocked by sedimentation. In a word, the flow of the downhole fluid in the multiphase environment may be different. When the flow rate of the downhole fluid is less, the downhole fluid may not fill the whole casing, in this circumstance, only a portion of the plurality of turbines 11 may operate and may be also driven by the downhole fluid having different flow rates. The number and the distribution of turbines 11 of the present disclosure can be suitably selected based on the downhole fluid and its flow condition and in combination of product costs.

The downhole power generation system 200 of the second embodiment can not only allow each of the plurality of turbines to operate at different rotational speed and maximize the output power generated from each of the plurality of turbine generator systems 1 or system efficiency, but also achieve a reliable and redundant power supply for the load 300.

Optimized Power Control Method for Downhole Power Generation System

Figure 12:
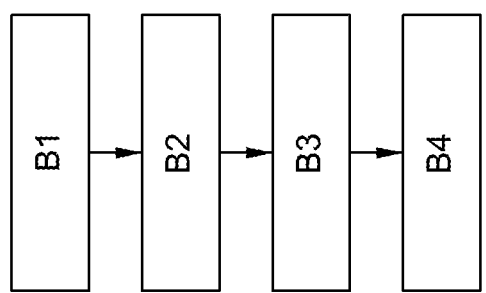
FIG. 12 is a flow chart of an optimized power control method for a downhole power generation system in accordance with an embodiment of the present disclosure.

FIG. 12 illustrates a flow chart of an optimized power control method for a downhole power generation system in accordance with an embodiment of the present disclosure. The optimized power control method may be applied to the downhole power generation system 100 of the first embodiment and the downhole power generation system 200 of the second embodiment. The optimized power control method may include the steps as follows.

As shown in FIG. 12, in block B1, hydro energy from flow of a downhole fluid may be harvested via one or more turbines 11 in one or more turbine generator systems 1, and one or more rotational energies may be thus generated. In the embodiment with multiple turbines 11, the multiple turbines 11 may be so positioned physically that one or more turbines is exposed to the downhole fluid. Due to different physical positions of the plurality of turbines 11, the one or more turbines 11 may be driven by the downhole fluid having different flow rates, and thus the one or more rotational energies generated may be different.

In block B2, the one or more rotational energies from the one or more turbines 11 may be converted to one or more electrical energies and outputting one or more DC voltages by one or more generators 12 with the AC-DC rectifier 13 in one or more turbine generator systems 1. Because the one or more rotational energies generated may be different, the one or more DC voltages output may have different voltage values.

In block B3, an output voltage of each of the one or more generators 12 may be controlled to regulate.

In block B4, a regulated output voltage of each generator 12 may be provided to a load 300 so that each of the one more turbine generator systems 1 has an optimized power output. The optimized power output targets on a maximum power output or a maximum system efficiency of each turbine generator system 1.

Hereinafter, how to control to regulate the output voltage of each generator 12 in block B3 of FIG. 12 will be described in detail with reference to FIGS. 13 and 14.

Figure 13:
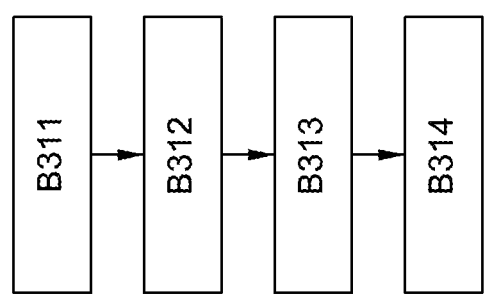
FIG. 13 illustrates steps how to control to regulate an output voltage of the generator of FIG. 12 in one case.

FIG. 13 illustrates steps how to control to regulate the output voltage of each generator 12 in one case. As shown in FIG. 13, in block B311, each generator 12 is disconnected from the load 300, and then the process goes to block B312.

In block B312, an output voltage of each generator 12 is measured after disconnection of each generator 12 from the load 300 for an enough long time. In this case, the measured output voltage of each generator 12 is an open circuit voltage $V_O$ of each generator 12. The open circuit voltage $V_O$ of each generator 12 is defined as a constant no load voltage of each generator 12 after disconnection.

In block B313, each generator 12 is reconnected with the load 300, and then the process goes to block B314.

In block B314, the output voltage of each generator 12 is regulated equal to the measured open circuit voltage $V_O$ of each generator 12 in block B312 multiplied by an optimized voltage ratio $R_{opc}$ predefined for optimized power control of each turbine generator system 1, as shown in equation (5) above. The optimized voltage ratio $R_{opc}$ of each turbine generator system 1 is equal to a ratio of an optimized power control voltage $V_{opc}$ to an open circuit voltage $V_O$ of each generator 12 at any one rotational speed of each generator 12. The optimized power control voltage $V_{opc}$ of each generator 12 is defined as a voltage in which each turbine generator system 1 has the optimized power output, and the open circuit voltage $V_O$ of each generator 12 is defined as a constant no load voltage of each generator 12.

Figure 14:
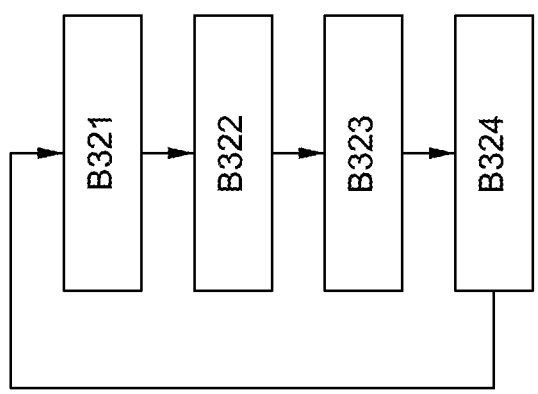
FIG. 14 illustrates steps how to control to regulate an output voltage of the generator of FIG. 12 in another case.

FIG. 14 illustrates steps how to control to regulate the output voltage of each generator 12 in another case. As shown in FIG. 14, in block B321, each generator 12 is disconnected from the load 300, and then the process goes to block B322.

In block B322, a cutoff voltage $V_{cutoff}$ of each generator 12 is measured after a predetermined cutoff time $T_{cutoff}$. The predetermined cutoff time $T_{cutoff}$ may depend on the characteristics of each turbine generator system 1.

In block B323, each generator 12 is reconnected with the load 300, and then the process goes to block B324.

In block B324, the output voltage of each generator 12 is regulated equal to the measured cutoff voltage $V_{cutoff}$ of each generator 12 in block B322 multiplied by the optimized voltage ratio $R_{opc}$ of each turbine generator system 1, as shown in equation (6) above.

In order that the output voltage of the generator 12 after disconnection may reach the open circuit voltage $V_O$, after block b324, the process will return to block b321 and continue to repeat blocks B321-B324 above till the measured cutoff voltage $V_{cutoff}$ of the generator 12 approaches constant.

The optimized power control method of the present disclosure can not only allow each of the plurality of turbines 11 to operate at different rotational speed and maximize the output power generated from each of the plurality of turbine generator systems 1 or system efficiency, but also achieve a reliable and redundant power supply for the load 300.

While steps of the optimized power control method for the downhole power generation system in accordance with embodiments of the present disclosure are illustrated as functional blocks, the order of the blocks and the separation of the steps among the various blocks shown in FIGS. 12-14 are not intended to be limiting. For example, the blocks may be performed in a different order and a step associated with one block may be combined with one or more other blocks or may be sub-divided into a number of blocks.

While the disclosure has been illustrated and described in typical embodiments, it is not intended to be limited to the details shown, since various modifications and substitutions can be made without departing in any way from the spirit of the present disclosure. As such, further modifications and equivalents of the disclosure herein disclosed may occur to persons skilled in the art using no more than routine experimentation, and all such modifications and equivalents are believed to be within the spirit and scope of the disclosure as defined by the following claims.

What is claimed is:

1. A downhole power generation system, comprising:
a turbine generator system comprising:
a turbine driven by a flow of a downhole fluid to rotate;
a generator coupled with the turbine and having an AC-DC rectifier, wherein the generator is configured for converting rotational energy from the turbine to electrical energy and outputting a direct current voltage; and
an optimized power control unit via which the turbine generator system is coupled to a load, wherein the optimized power control unit includes a switch configured to disconnect the generator from the load, a voltage measuring device configured to measure a first voltage of the generator when the generator is connected to the load and measure a second voltage of the generator when the generator is disconnected from the load, and a voltage regulator configured to regulate an output voltage of the generator based on the first measured voltage and the second measured voltage to provide a regulated output voltage to the load so that the turbine generator system has an optimized power output.

2. The downhole power generation system of claim 1, wherein the optimized power output targets on a maximum power output or a maximum system efficiency of the turbine generator system.

3. The downhole power generation system of claim 1, wherein the downhole power generation system comprises a plurality of turbine generator systems comprising a plurality of turbines, a plurality of generators and a plurality of optimized power control units, and the plurality of turbines in the plurality of turbine generator systems are so positioned physically that one or more of the plurality of turbines is exposed to the downhole fluid.

4. The downhole power generation system of claim 3, wherein rotational speeds of the plurality of turbines and amounts of power generated from the plurality of turbine generator systems depend on physical positions of the plurality of turbines.

5. The downhole power generation system of claim 1, wherein the switch is configured to repeatedly disconnect the generator from the load, the voltage measuring device is configured to repeatedly measure the first voltage of the generator when the generator is connected to the load and repeatedly measure the second voltage of the generator when the generator is disconnected from the load, and the voltage regulator is configured to regulate the output voltage of the generator based on the repeated measurement of the first voltage and the second voltage.

6. A downhole power generation system comprising:
a turbine generator system comprising:
a turbine driven by a flow of a downhole fluid to rotate;
a generator coupled with the turbine and having an AC-DC rectifier, wherein the generator is configured for converting rotational energy from the turbine to electrical energy and outputting a direct current voltage; and
an optimized power control unit via which the turbine generator system is coupled to a load, wherein the optimized power control unit is configured for controlling to regulate an output voltage of the generator and providing a regulated output voltage to the load so that the turbine generator system has an optimized power output, wherein the optimized power control unit is configured for measuring a first voltage of the generator when the generator is connected to the load, disconnecting the generator from the load and measuring a second voltage of the generator after disconnection, and reconnecting the generator with the load and regulating the output voltage of the generator based on the first measured voltage and the second measured voltage for optimized power control.

7. The downhole power generation system of claim 6, wherein the measured second voltage includes an open circuit voltage of the generator, the open circuit voltage of the generator being defined as a constant no load voltage of the generator after the disconnection.

8. The downhole power generation system of claim 6, wherein the measured second voltage includes a cutoff voltage of the generator, the optimized power control unit configured for measuring the measured cutoff voltage after a predetermined cutoff time.

9. The downhole power generation system of claim 8, wherein the optimized power control unit is configured for repeating the steps of disconnecting, measuring the measured cutoff voltage, reconnecting and regulating until the measured cutoff voltage of the generator approaches a constant value.

10. The downhole power generation system of claim 8, wherein the optimized power control unit is configured for regulating the output voltage so that the output voltage is constant for different flow rates of the downhole fluid.

11. The downhole power generation system of claim 6, wherein the optimized power control unit is configured for regulating the output voltage so that the output voltage is constant for different flow rates of the downhole fluid.

12. An optimized power control method for a downhole power generation system, wherein the downhole power generation system comprises one or more turbine generator systems each comprising a turbine, and a generator coupled with the turbine and having an AC-DC rectifier, the optimized power control method comprising:
harvesting hydro energy from a flow of a downhole fluid via the one or more turbines in the one or more turbine generator systems;
converting one or more rotational energies from the one or more turbines, by the one or more generators in the one or more turbine generator systems, to one or more electrical energies and outputting one or more direct current voltages;
controlling to regulate an output voltage of each of the one or more generators, wherein the controlling includes:
measuring a first voltage of each of the one or more generators by a voltage measuring device when the one or more generators are connected to one or more loads;
disconnecting the one or more generators from the one or more loads, measuring a second voltage of each of the one or more generators after disconnection, and reconnecting the one or more generators with the one or more loads; and
regulating the output voltage of each of the one or more generators by a voltage regulator based on the measured first voltage and the measured second voltage; and
providing the regulated output voltage of each of the one or more generators to the loads so that each of the one or more turbine generator systems has an optimized power output.

13. The optimized power control method of claim 12, further comprising repeating the steps of measuring the first voltage, disconnecting the one or more generators, measuring the second voltage, and reconnecting the one or more generators, wherein regulating the output voltage by the voltage regulator is based on the repeated measurement of the first voltage and the second voltage.

14. An optimized power control method for a downhole power generation system, wherein the downhole power generation system comprises a turbine generator systems comprising a turbine, and a generator coupled with the turbine and having an AC-DC rectifier, the optimized power control method comprising:
controlling to regulate an output voltage of the generator, the generator configured to convert rotational energy from the turbine, the turbine driven by a flow of a downhole fluid; and
providing a regulated output voltage of the generator to a load so that the turbine generator system has an optimized power output, wherein controlling to regulate the output voltage of the generator comprises:
measuring a first voltage of the generator when the generator is connected to the load;
disconnecting the generator from the load and measuring a second voltage of the generator after disconnection; and
reconnecting the generator with the load and regulating the output voltage of the generator based on the measured first voltage and the measured second voltage.

15. The optimized power control method of claim 14, wherein measuring the second voltage of the generator after disconnection comprises measuring an open circuit voltage of the generator, the open circuit voltage defined as a constant no load voltage of the generator after the disconnection.

16. The optimized power control method of claim 14, wherein measuring the second voltage of the generator after disconnection comprises measuring a cutoff voltage of the generator after a predetermined cutoff voltage.

17. The optimized power control method of claim 16, further comprising:
   repeating the steps of disconnecting, measuring the cutoff value, reconnecting and regulating until the measured cutoff voltage of the generator approaches a constant value.

18. The optimized power control method of claim 14, wherein the output voltage is constant for different flow rates of the downhole fluid.

* * * * *